United States Patent [19]

Katoh et al.

[11] Patent Number: 5,648,693
[45] Date of Patent: Jul. 15, 1997

[54] DISK DRIVING MOTOR WITH LOW NOISE LEAD WIRE ARRANGEMENT FOR FREQUENCY GENERATOR

[75] Inventors: Noriyuki Katoh, Tokyo; Takahiro Sakaguchi, Kokubunji; Koukichi Okada, Kawasaki, all of Japan

[73] Assignee: Teac Corporation, Japan

[21] Appl. No.: 564,966

[22] Filed: Nov. 30, 1995

[30] Foreign Application Priority Data

Dec. 2, 1994 [JP] Japan ................. 6-299403

[51] Int. Cl.$^6$ ..................... H02K 21/24; H02K 29/00
[52] U.S. Cl. ............ 310/67 R; 310/68 R; 310/156; 310/268; 360/98.07; 360/99.04; 360/99.08
[58] Field of Search ................ 310/67 R, 68 R, 310/268, 156; 360/98.07, 99.04, 99.08

[56] References Cited

U.S. PATENT DOCUMENTS

| | | | |
|---|---|---|---|
| 4,668,884 | 5/1987 | Amao et al. | 310/68 R |
| 4,701,649 | 10/1987 | Maemine | 310/68 R |
| 4,701,650 | 10/1987 | Maemine | 310/68 R |
| 4,737,675 | 4/1988 | Maemine et al. | 310/268 |
| 4,782,259 | 11/1988 | Shikama et al. | 310/156 |

FOREIGN PATENT DOCUMENTS

| | | |
|---|---|---|
| 55-8288 | 1/1980 | Japan . |
| 60-183589 | 12/1985 | Japan . |
| 62-29771 | 2/1987 | Japan . |

*Primary Examiner*—Clayton E. Laballe
*Assistant Examiner*—Tran N. Nguyen
*Attorney, Agent, or Firm*—Andrus, Sceales, Starke & Sawall

[57] ABSTRACT

A stator includes a frequency generating pattern, a driving coil composite pattern and lead lines. A rotor includes a frequency generating pattern, a driving coil composite and lead lines. A rotor includes a rotor magnet. A separation angle formed by the lead lines is an angle obtained by multiplying an integer and an separation angle formed by a pair of S-pole and magnetic poles of the rotor magnet adjacent to each other. Further, assuming that that an area between the lead lines and U-phase coils produce overlapping areas $Su_1$ and $Su_2$ in a top view, that the same area and a V-phase coil produce an overlapping area $Sv_1$, and that the same area and a W-phase coil produce an overlapping area $Sw_1$, the relationship $Su_1+Su_2:Sv_1:Sw_1=1.0:1.0:1.0$ exits. With this arrangement, the lead lines are least affected by the rotor magnet and the driving coil composite.

3 Claims, 13 Drawing Sheets

FIG. 4

AREA RATIO OF V PHASE TO U PHASE — 120

| AREA RATIO OF W PHASE TO U PHASE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.0 | ① 1.000 | 0.954 | 0.917 | 0.889 | 0.872 | 0.866 | 0.872 | 0.889 | 0.917 | 0.954 | ② 1.000 |
| 0.1 | 0.954 | 0.900 | 0.854 | 0.819 | 0.794 | 0.781 | 0.781 | 0.794 | 0.819 | 0.854 | 0.900 |
| 0.2 | 0.917 | 0.854 | 0.800 | 0.755 | 0.721 | 0.700 | 0.693 | 0.700 | 0.721 | 0.755 | 0.800 |
| 0.3 | 0.889 | 0.819 | 0.755 | ④ 0.700 | 0.656 | 0.625 | 0.608 | 0.608 | 0.625 | 0.656 | 0.700 |
| 0.4 | 0.872 | 0.794 | 0.721 | 0.656 | 0.600 | 0.557 | 0.529 | 0.520 | 0.529 | 0.557 | 0.600 |
| 0.5 | 0.866 | 0.781 | 0.700 | 0.625 | 0.557 | 0.500 | 0.458 | 0.436 | 0.436 | 0.458 | 0.500 |
| 0.6 | 0.872 | 0.781 | 0.693 | 0.608 | 0.529 | 0.458 | 0.400 | 0.361 | 0.346 | 0.361 | 0.400 |
| 0.7 | 0.889 | 0.794 | 0.700 | 0.608 | 0.520 | 0.436 | 0.361 | 0.300 | 0.265 | 0.265 | 0.300 |
| 0.8 | 0.917 | 0.819 | 0.721 | 0.625 | 0.529 | 0.436 | 0.346 | 0.265 | 0.200 | ⑥ 0.173 | 0.200 |
| 0.9 | 0.954 | 0.854 | 0.755 | 0.656 | 0.557 | 0.458 | 0.361 | 0.265 | 0.173 | 0.100 | 0.100 |
| 1.0 | ③ 1.000 | 0.900 | 0.800 | 0.700 | 0.600 | 0.500 | 0.400 | 0.300 | 0.200 | 0.100 | ⑤ 0.000 |

DISK DRIVING MOTOR WITH LOW NOISE LEAD WIRE ARRANGEMENT FOR FREQUENCY GENERATOR

BACKGROUND OF THE INVENTION

1. Field of the Invention

The present invention relates to motors, and more particularly to a disk driving motor built in a disk drive apparatus.

The height of disk drive apparatuses such as a magnetic disk drive apparatus or an optical disk drive apparatus has been reduced. A brushless dc motor of an axial-gap type is particularly suitable for the purpose of reducing the height of a disk drive and is used extensively as a disk driving motor.

With the increase in the recording density, there is a requirement for a stable control of the rotational speed of the disk driving motor.

FIG. 1 is a block diagram of a driving control system of a disk driving motor 10. The disk driving motor 10 has a stator part 11 and a rotor part 12, and is built in a disk drive apparatus 20.

The rotor part 12 is opposite to the stator part 11 via an axial gap 13.

The rotor part 12 has a disc-shaped rotor magnet 14 magnetized so that multiple magnetic poles are disposed in the circumferential direction.

The stator part 11 has a driving coil composite 15 which is annularly arranged and a frequency generation pattern 16 which is also annularly arranged.

A motor driving circuit 17 and a servo system circuit 18 are also provided for the motor 10.

The servo system circuit 18 generates a servo signal as a result of comparing a rotational speed detecting signal from the frequency generation pattern 16 and regenerated clocks from a PLL.

The motor driving circuit 17 outputs a motor driving signal for generating a rotating magnetic field around the driving coil composite 15. The rotating magnetic field causes the rotor part 12 to rotate.

While being driven, the motor 10 (rotor part 12) has its rotational speed controlled in accordance with the rotational speed detecting signal and the regenerated clocks so that a disk (not shown) is rotated at a constant angular or linear speed.

Accordingly, in order to read information from and write information to the disk in a satisfactory manner in terms of the quality, it is necessary for the rotational speed control of the motor 10 to be performed with precision. For this purpose, it is essential that the rotational speed detecting signal characterized by no degradation in the S/N ratio be obtained.

The arrangement of the driving coil composite 15 and the frequency generation pattern 16 in the stator part 11 will now be examined closely.

In one conceivable arrangement of a stator part 11A shown in FIG. 2A, the annular driving coil composite 15 is disposed toward the periphery and the annular frequency generation pattern 16 is disposed toward the center. In another conceivable arrangement of a stator part 11B shown in FIG. 2B, the frequency generation pattern 16 is disposed toward the periphery and the driving coil composite 15 is disposed toward the center.

It is known that the former arrangement provides a larger output torque of the motor, a smaller power consumption and a greater driving efficiency than the latter.

Therefore, the motor 10 is usually constructed to have the stator part 11A as shown in FIG. 2A.

However, it is to be noted that two lead lines 25 and 26 for leading the rotational speed detecting signal outside the driving coil composite 15 are provided in the motor 10 of the above construction so as to traverse the driving coil composite 15 in a top view.

For this reason, the lead lines 25 and 26 are subject to the influence of the rotating magnetic field generated by the driving coil composite 15 and the influence of the magnetic field of the rotor magnet 14. Thus, it is likely that an unnecessary current (noise) is induced.

Further, it is difficult to obtain a high-level rotational detecting signal according to the construction of FIG. 2A.

If a noise is generated in the lead lines 25 and 26, the S/N ratio of the rotational speed detecting signal easily drops.

A drop in the S/N ratio of the rotational speed detecting signal may invite an unstable control of the rotational speed.

Accordingly, a scheme for preventing noise in the lead lines 25 and 26 as much as possible is required.

2. Description of the Related Art

FIGS. 3A and 3B show a three-phase brushless dc motor 30 of an axial-gap type. FIG. 3A shows a rotor magnet 31 of the motor 30 and FIG. 3B shows a stator part 40 of the motor 30.

The rotor magnet 31 is disc-shaped and magnetized so that there are twenty magnetic poles including N-poles 33N and S-poles 33S disposed in the circumferential direction. The adjacent N-pole and S-pole form a separation angle $\alpha$.

The stator part 40 comprises a substrate 41 and a driving coil composite 42 fixed to the substrate 41.

The substrate 41 has a frequency generation pattern 43, and lead lines 44 and 45 provided on the surface of the pattern 43.

The driving coil composite 42 is constructed such that three types of phase coils are periodically arranged in the circumferential direction. Specifically, a U-phase coil 42U, a V-phase coil 42V, a W-phase coil 42W, a U-phase coil 42U, a V-phase coil 42V ... are arranged in the stated order. The total number of coils (magnetic poles) is fifteen.

When the motor 30 is driven, the U-phase coil 42U, the V-phase coil 42V, the W-phase coil 42W are energized in the stated order so that the U-phase coil 42U, the V-phase coil 42V, the W-phase coil 42W ... are excited in the stated order. As a result, a rotating magnetic field is produced so that the rotor magnet 31 is rotated.

While being rotated, the rotor magnet 31 produces an alternating magnetic flux.

The lead lines 44 and 45 extend straight in respective radial directions with a separation of an angle $\alpha$ (equal to the angle $\alpha$ between the N-pole and the S-pole).

Since the lead lines 44 and 45 are separated by the angle $\alpha$, the alternating magnetic flux produced by the rotation of the rotor magnet 31 is canceled by the magnetic flux in a one-turn coil formed by the lead lines 44 and 45. Therefore, no current is induced in the one-turn coil. That is, no current is produced in the lead lines 44 and 45.

Accordingly, a rotational speed detecting signal carrying no noise is obtained at terminals 46 and 47.

The conventional motor 30 described above has the following two problems (i) and (ii).

(i) A current may be induced as a result of a variation in precision with which the motor is assembled.

Ampere's law provides the following relationship:

$$\oint_c B \cdot dS = \mu_0 I \qquad (1)$$

where S indicates an area formed by any given closed curve (circuit) C, B a density of magnetic flux passing through the area, and I a current induced in the closed curve.

In the conventional motor 30, the current I as defined by the equation (1) provides a noise.

The equation (1) tells us that noise reduction can be achieved by reducing the magnetic flux B·dS, that is, by reducing the magnetic flux density B.

Since the lead lines 44 and 45 extend straight in the radial directions of the motor, the one-turn coil formed by the lead lines 44 and 45 is subject to the effect of a variation in precision with which the magnetic poles 33N and 33S of the rotor magnet 31 are positioned or to the effect of an eccentricity of the rotor magnet 31.

As a result of the above-mentioned effects, the magnitude of the volume of the magnetic flux in the N direction differs from that of the magnetic flux in the S direction, thus causing a net magnetic flux to remain. Because of this net magnetic flux that remains, a noise is produced so that the S/N ratio of the rotational speed detecting signal is degraded.

The degradation in the S/N ratio becomes a problem in mass-producing the motor.

(ii) A noise is produced due to a rotating magnetic field produced by the driving coil composite 42.

Referring to FIG. 3B, the lead line 44 passes under the V-phase coil 42W and the lead line 45 passes under the W-phase coil 42V, the U-phase coil 42U residing between the lead lines 44 and 45.

An examination will be given below of the ratio between areas by which a band-like area 55 provided between the lead lines 44 and 45 overlaps each of the U-phase coil 42U, the V-phase coil 42V and the W-phase coil 42W.

The entirety of an area Su of the U-phase coil 42U overlaps the area 55.

A ⅓ of an area Sv (about 0.3 Sv) of the V-phase coil 42V overlaps the area 55.

A ⅕ of an area Sw (about 0.2 Sw) of the W-phase coil 42W overlaps the area 55.

The areas of the phase coils 42U, 42V and 42W are identical to each other. That is, Su=Sv=Sw.

The ratio between areas by which the area 55 overlaps each of the coils 42U, 42V and 42W is given by:

$$Su:0.3Sv:0.2Sv = 1.0:0.3:0.2$$

The applicants of the present invention carried out an experiment in which the paths of the lead lines 44 and 45 are varied in order to analyze the associated density of the magnetic flux of the rotating magnetic field produced by the driving coil composite 42 and passing through the area 55 between the lead lines 44 and 45.

The analysis is based on the fact that the density B of the magnetic flux produced by the driving coil composite 42 and passing through the area 55 between the lead lines 44 and 45 underneath the driving coil composite 42 is given by:

$$B(t) = Bu(t) + Bv(t) + Bw(t) = 0$$

where Bu is a density of the magnetic flux produced by the U-phase coil 42U, Bv a density of the magnetic flux produced by the V-phase coil 42V, Bw a density of the magnetic flux 42W produced by the W-phase coil 42W and t a time.

FIG. 4 shows a result obtained through the experiment.

FIG. 4 is a table showing relative values of the density of the magnetic flux passing through the area 55, obtained when the area of the U-phase coil 42u is fixed to a relative value of 1.0, and the area of the V-phase coil 42V and the area of the W-phase coil 42W are varied. More specifically, the experiment was carried out such that the area 55 between the lead lines 44 and 45 always includes the entirety of the U-phase coil 42U, and such that the areas of the V-phase coil 42V and the W-phase coil 42W included in the area 55 are varied.

Referring to FIG. 4, ① indicates the magnetic flux density existing in the area 55 when the area 55 includes only the entirety of the U-phase coil 42U.

② indicates a case where the area 55 includes the entirety of the U-phase coil 42U and the entirety of the V-phase coil 42V.

③ indicates a case where the area 55 includes the entirety of the U-phase coil 42U and the entirety of the W-phase coil 42W.

④ indicates a case where the area 55 is made to lie as shown in FIG. 3B.

In the above-described cases ①, ② and ③, the magnetic density has a maximum relative value of 1.00.

It will be noted that the lead lines 44 and 45 are subject to the influence of the rotating magnetic field produced by the driving coil composite 42 to a largest degree when the paths of the lead lines 44 and 45 are set as in the cases ①, ② and ③ described above. As a result, noise arising from the induced current is at a maximum level in these cases.

The relative level of the noise in these cases is designated as 1.000.

In the conventional example shown in FIG. 3B, the density of the magnetic flux passing through the area 55 has a relative value of 0.755, which is comparatively high.

Therefore, in the motor 30 shown in FIGS. 3A and 3B, a noise having a relatively high level of 0.755 is produced due to the rotating magnetic field produced by the driving coil composite 42.

Consequently, it is inevitable that the S/N ratio of the rotational speed detecting signal is degraded.

To summarize the above, the conventional motor 30 has a problem in that the S/N ratio of the rotational speed detecting signal is easily degraded due to a variation in precision with which the motor is assembled. A further problem is that, even if precision of the assembly is improved, the rotating magnetic field produced by the driving coil composite 42 is bound to invite a degradation in the S/N ratio of the rotational speed detecting signal.

SUMMARY OF THE INVENTION

Accordingly, an object of the present invention is to provide a motor in which the aforementioned problems are eliminated.

Another and further object of the present invention is to provide a brushless dc motor of an axial-gap type in which a frequency-generating pattern is provided toward the center of the motor with respect to the driving coil composite so that a rotational speed detecting signal characterized by no degradation in the S/N ratio is obtained.

In order to achieve the aforementioned objects, the present invention provides a motor comprising:

a stator; and a rotor opposite to the stator via an axial gap;

wherein the stator comprises a substrate;

a driving coil provided on the substrate so as to produce a rotating magnetic field for driving the motor, the driving coil being constituted of a plurality of phase coils of more than one types disposed to form a ring;

a frequency generating pattern provided on the substrate more toward its center than the driving coil; and two lead lines each of which has its one end connected to the frequency generating pattern and is formed on the substrate so as to traverse the driving coil in a top view and extend as far as a periphery of the driving coil;

wherein the rotor comprises a plate-shaped rotor magnet which is magnetized such that a multiple magnetic poles exist in a circumferential direction, and which faces the driving coil, the frequency generating pattern and the two lead lines;

and wherein paths of the two lead lines extend generally spirally so as to traverse, in a top view, at least one of the phase coils constituting the driving coil in a circumferential direction, substantially equal areas, from phase to phase, of each of the traversed phase coils being covered by an area between the two lead lines in a top view. According to the motor of the present invention, lead lines extend spirally across a plurality of magnetic poles of the rotor magnet along the circumference of the rotor magnet. This arrangement functions such that the net alternating magnetic flux that exists in an area between the lead lines as a result of the rotor magnet rotating is approximately zero. The construction whereby the paths of the two lead lines are set such that equal areas, from phase to phase, of each of the phase coils are covered by an area between the two lead lines in a top view ensures that the density of the magnetic flux of the rotating magnetic field produced by the driving coil and passing through the area is zero.

In order to achieve the aforementioned objects, the present invention also provides a motor comprising:

a stator; and a rotor opposite to the stator via an axial gap;

wherein the stator comprises a substrate;

a driving coil provided on the substrate so as to produce a rotating magnetic field for driving the motor, the driving coil being constituted of a plurality of phase coils of more than one types disposed to form a ring;

a frequency generating pattern provided on the substrate more toward its center than the driving coil; and two lead lines each of which has its one end connected to the frequency generating pattern and is formed on the substrate so as to traverse the driving coil in a top view and extend as far as a periphery of the driving coil;

wherein the rotor comprises a plate-shaped rotor magnet which is magnetized such that a multiple magnetic poles exist in a circumferential direction, and which faces the driving coil, the frequency generating pattern and the two lead lines;

and wherein paths of the two lead lines extend generally spirally so as to traverse, in a top view, at least one of the phase coils constituting the driving coil in a circumferential direction; a separation angle formed by the two lead lines being an angle obtained by multiplying an integer and an separation angle formed by a pair of S-pole and N-pole of the rotor magnet adjacent to each other, and substantially equal areas, from phase to phase, of each of the traversed phase coils being covered by an area between the two lead lines in a top view. The construction whereby the paths of the two lead lines are set such that an angle between the two lead lines is equal to an angle obtained by multiplying an integer by an angle formed by a pair of adjacent N-pole and S-pole constituting the rotor magnet ensures that the net alternating magnetic flux that exists in the area between the lead lines as a result of the rotor magnet rotating is zero.

BRIEF DESCRIPTION OF THE DRAWINGS

Other objects and further features of the present invention will be apparent from the following detailed description when read in conjunction with the accompanying drawings, in which:

FIG. 4 is a table showing relative values of the density of the magnetic flux passing through an area between lead lines, the relative values being obtained when an area of a U-phase coil is fixed to a relative value of 1.0 and areas of a V-phase coil and a W-phase coil are varied;

DESCRIPTION OF THE PREFERRED EMBODIMENTS

For the sake of conveniences, a description will first be given of an outline of the present invention.

Figure 5:
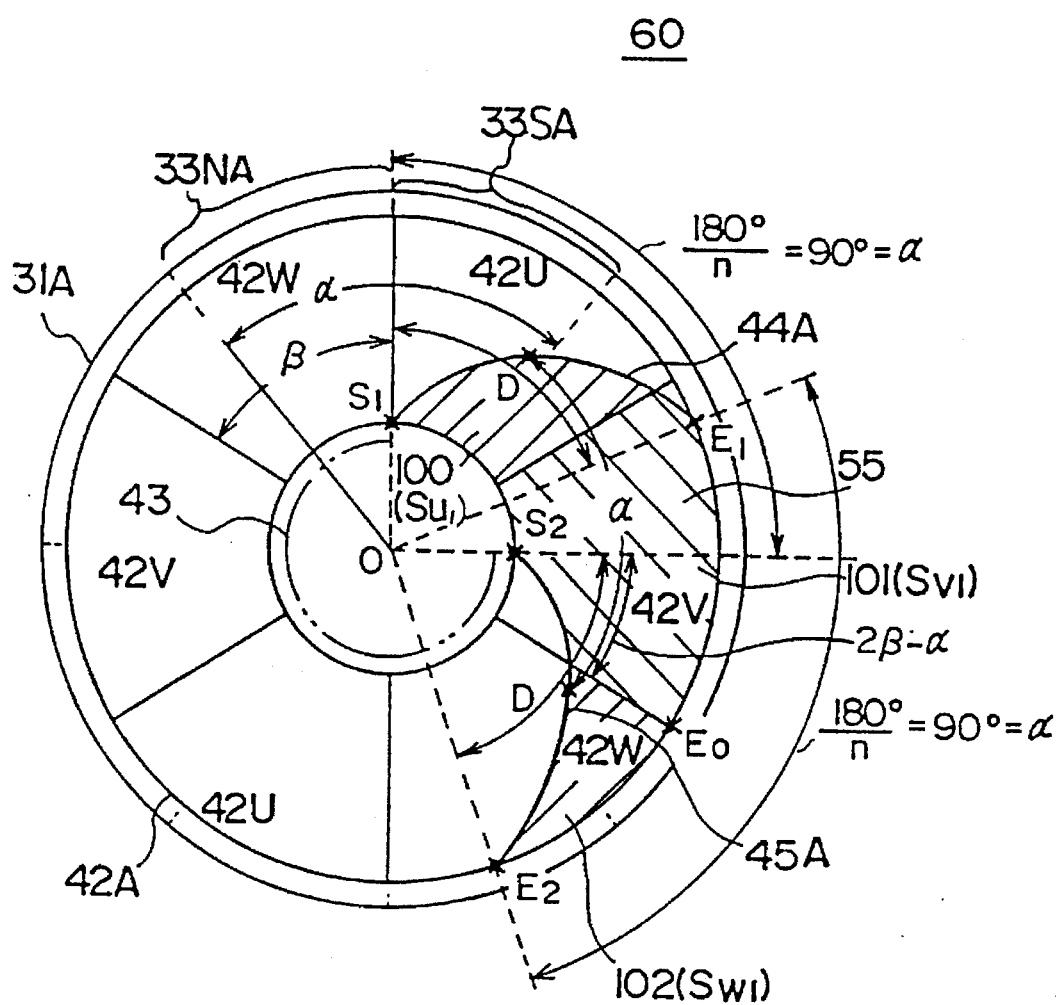
FIG. 5 is a schematic view of a motor according to the present invention.

FIG. 5 is a schematic view of a three-phase motor 60.

The motor 60 comprises a frequency-generating pattern 43, a driving coil composite 42A and a rotor magnet 31A.

Generally, assuming that the number of poles in the rotor magnet 31A of the three-phase motor 60 is 4·n (where n is an integer equal to or greater than 1), the number of poles (the number of coils) in the driving coil composite 42A is 3×n.

In the motor 60 shown in FIG. 5, n=2 so that the rotor magnet 31A has a total of eight magnetic poles 33A including four N-poles 33NA and four S-poles 33SA. The coil driving coil composite 42A has a total of six coils including two U-phase coils 42U, two V-phase coils 42V and two W-phase coils 42W.

An angle formed by one of the magnetic poles (33SA or 33NA) of the rotor magnet 31A is 360/4n=90/n degrees.

An angle formed by a pair of adjacent magnetic poles 33NA and 33SA is (90/n)×2=180/n degrees. This angle is designated as $\alpha$.

An angle formed by adjacent phase coils is 360/3n=120/n. This angle is designated as $\beta$.

Since n is an integer greater than 1, $$\alpha > \beta$$

More specifically, $$\alpha = 1.5\beta$$

Referring to FIG. 5, it is also to be noted that lead lines 44A and 45A extend spirally.

The lead line 44A starts at a point $S_1$ and ends at a point $E_1$. The lead line 45A starts at a point $S_2$ and ends at a point $E_2$.

It is also to be noted that one of the V-phase coils 42V borders on the adjacent one of the V-phase coil 42W along a line that includes a point $E_0$.

An angle formed by the points $S_1$ and $S_2$ and an angle formed by the points $E_1$ and $E_2$ are both $\alpha$.

The point $E_2$ is displaced clockwise with respect to the point $E_0$.

An angle formed by the points $S_1$ and $E_1$ with respect to a center O is D and an angle formed by the points $S_2$ and $E_2$ is also D.

The angle D is chosen so as to satisfy the following inequality:

$$D > 2\beta - \alpha$$

Using n, $$2\beta - \alpha = 240/n - 180/n = 60/n$$

The lead lines 44A and 45A are set so as to satisfy the following conditions.

(1) The angle formed is always $\alpha$.
(2) The angle D formed by the point $S_1$ ($S_2$) and the point $E_1$ ($E_2$) is greater than $(2\beta - \alpha)$.

In an actual practice, the angle D is set to be about double the angle $(2\beta - \alpha)$.

Given that an area between the lead lines 44A and 45A is designated by a symbol 55, that portion of an area of the U-phase coil 42U that overlaps the area 55 is denoted by 100 having a magnitude $Su_1$, that portion of an area of the V-phase coil 42V that overlaps the area 55 is denoted by 101 having a magnitude $Sv_1$, and that portion of an area of the W-phase coil 42W that overlaps the area 55 is denoted by 102 having a magnitude $Sw_1$, the curvature (paths) of the lead lines 44A and 45A are set so as to satisfy the following conditions.

$$Su_1 : Sv_1 : Sw_1 = 1.0 : 1.0 : 1.0$$

In other words, the paths of the lead lines 44A and 45A are set such that $$Su_1 = Sv_1 = Sw_1$$

As a result of this arrangement, the relative value of the density of the magnetic flux of the rotating magnetic field produced by the driving coil composite 42A and passing through the area 55 becomes 0.00 (the case ⑤ in FIG. 4).

Therefore, no noise is produced in the lead lines 44A and 45A due to the rotating magnetic field produced by the driving coil composite 42A.

Since the lead lines 44A and 45A extend spirally, maintaining a separation angle of $\alpha$, no current is induced due to the rotation of the rotor magnet 31A. Hence, the lead lines 44 and 45 are not subject to the influence of precision with which the motor is assembled.

The angle formed by the points $S_1$ and $S_2$ with respect to the center O and an angle formed by the points $E_1$ and $E_2$ with respect to the center O may be m times (for example, two or three times) the angle $\alpha$, where m is an integer. The effects achieved by this arrangement is the same as that achieved when said angles are equal to $\alpha$.

A description will now be given of an embodiment of the present invention.

FIGS. 6A–9 show the motor 60 according to the embodiment of the present invention.

Figure 6A:
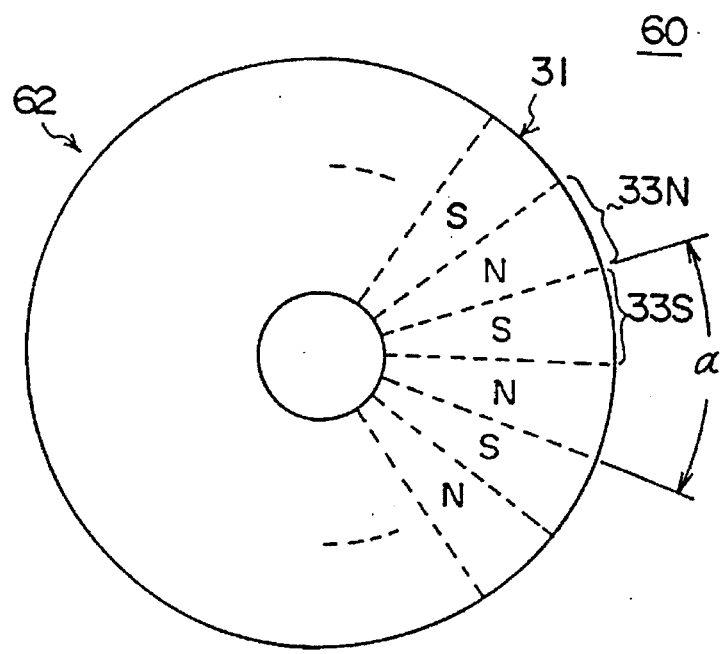
FIG. 6A shows a rotor part of the motor shown in FIG. 5.
Figure 6B:
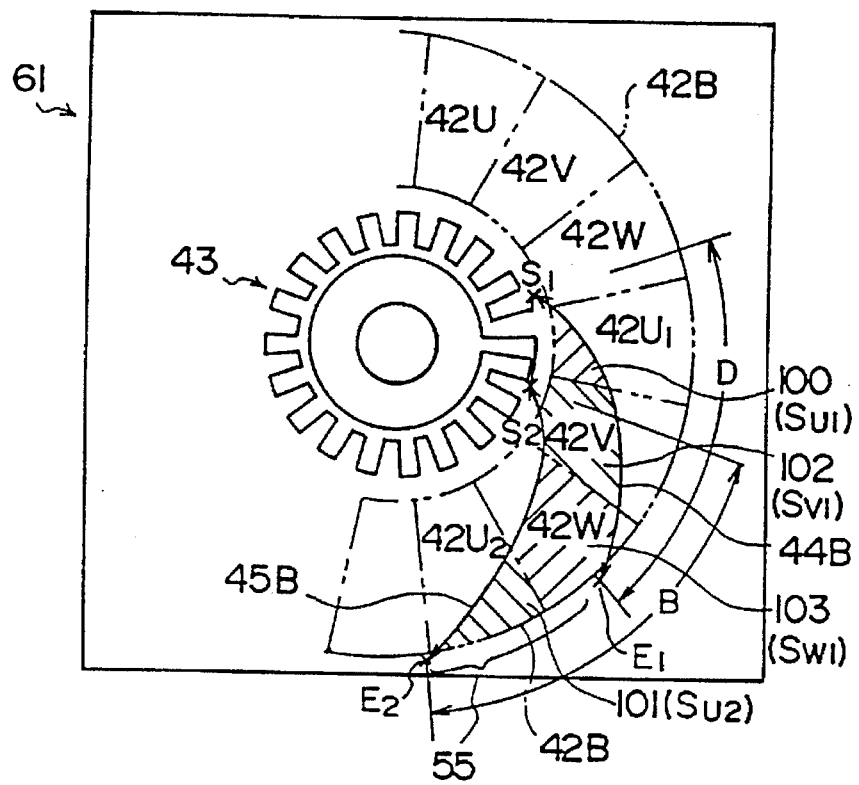
FIG. 6B shows a stator part of the motor shown in FIG. 5.
Figure 7:
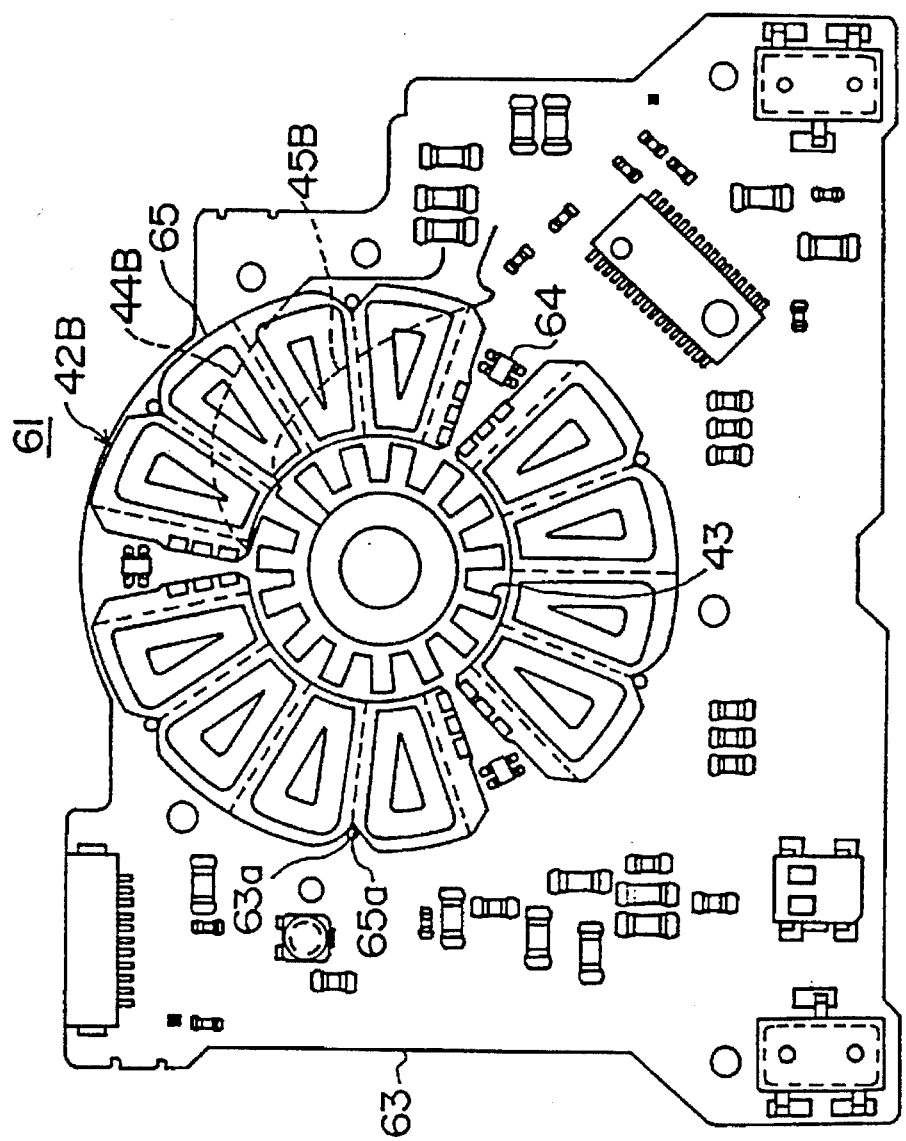
FIG. 7 is a top view showing the motor according to an embodiment of the present invention, with the rotor part being removed.
Figure 8:
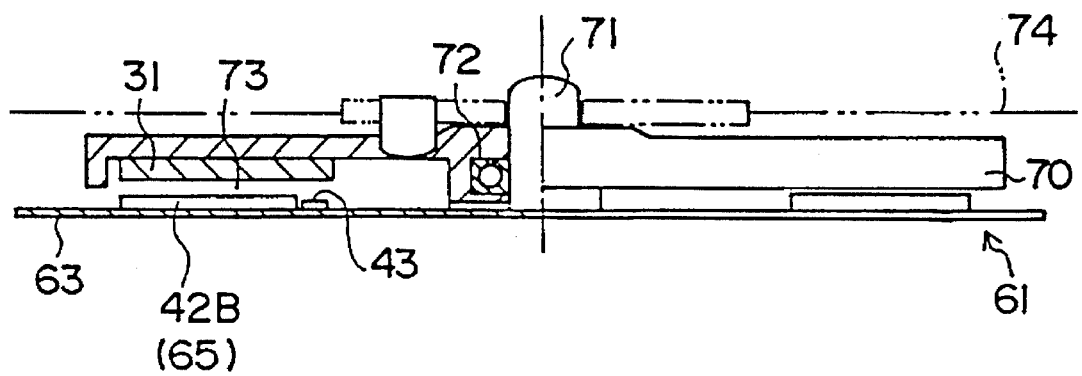
FIG. 8 is a longitudinal sectional view of the motor shown in FIG. 7.
Figure 9:
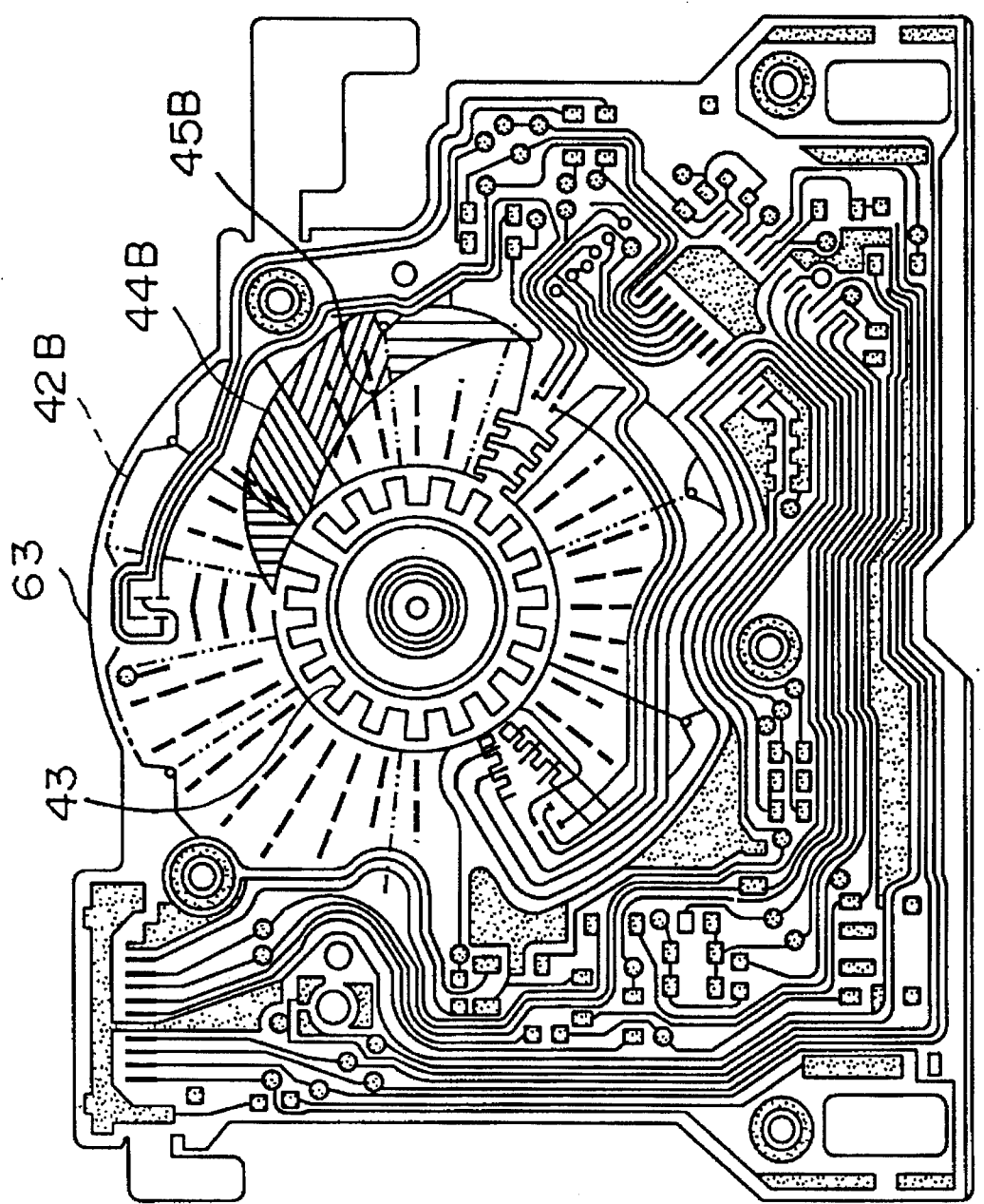
FIG. 9 shows a pattern on a substrate.

FIG. 6A shows a rotor part 62 of the motor 60, and FIG. 6B shows a stator part 61 of the motor 60. FIG. 7 is a top view of the motor 60 with the rotor part removed. FIG. 8 is a longitudinal sectional view of the motor 60. FIG. 9 is a top view showing a pattern on a substrate of the stator part.

The motor 60 is a three-phase brushless dc motor of an axial-gap type and is used as a disk driving motor for a magnetic disk drive apparatus.

In the motor 60, the above-mentioned integer n is equal to 5 so that the number of magnetic poles 33A is 20, and the number of coils is 12, virtually producing a total of 15 magnetic poles.

In FIGS. 6A through 9, those components that are the same as the components of FIG. 5 are designated by the same reference numerals.

The stator 61 comprises an iron substrate 63 having an insulating film, a driving coil composite 42B fixed on the substrate 63 and three Hall elements 64 also fixed on the substrate 63.

Lead lines 44B and 45B constituting an important part of the present invention, and a frequency generating pattern 43 are formed on the upper major surface of the substrate 43.

The driving coil composite 42B is formed by three sheet coils 65 substantially shaped like fans. A recess 65a of each of the sheet coils 65 is engaged with a projection 63a provided upright on the substrate 63 so that the sheet coils 65 forms a ring surrounding the frequency generating pattern 43.

The coil driving coil composite 42B is constructed such that the U-phase coil 42U, the V-phase coil 42V, the W-phase coil 42W . . . are disposed in the stated order.

The lead lines 44B and 45B will be described later.

As shown in FIG. 8, the rotor part 62 comprises a turntable 70 and a rotor magnet 31 fixed underneath the turntable 70.

The turntable 70 is rotatably supported by a bearing 72 on a shaft 71 provided upright on the substrate 63. A magnetic disk 74 is mounted on the turntable 70.

The rotor magnet 31 is opposite to the driving coil composite 42B (sheet coils 65) via an axial gap 73.

Figure 1:
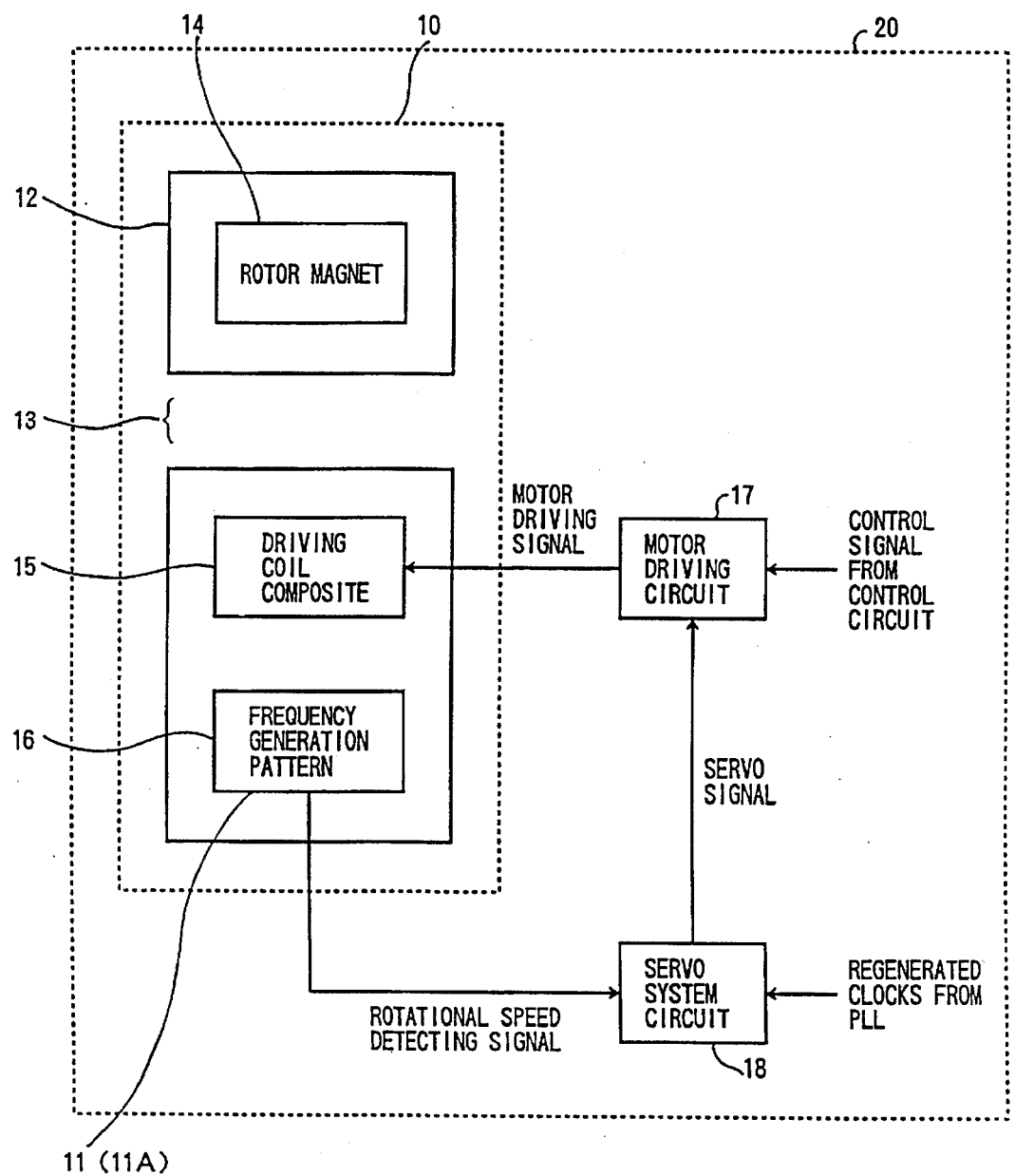
FIG. 1 is a block diagram of a driving control system of a disk driving motor.
Figure 2A:
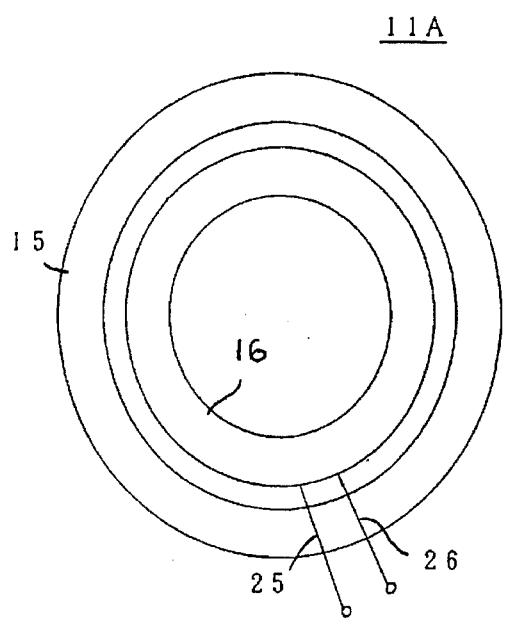
FIG. 2A shows a conceivable arrangement of a driving coil and a frequency-generating pattern.
Figure 2B:
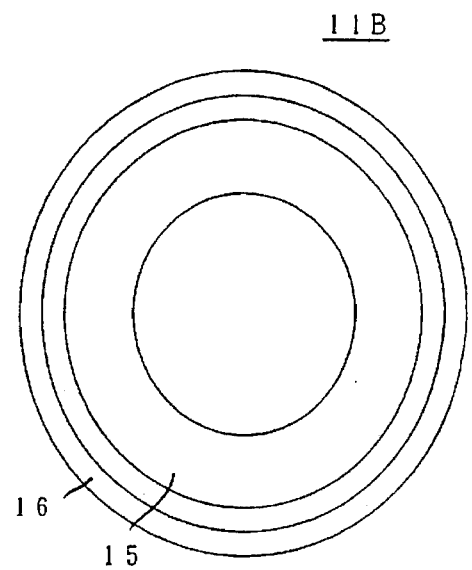
FIG. 2B shows another conceivable arrangement of the driving coil and the frequency-generating pattern.
Figure 3A:
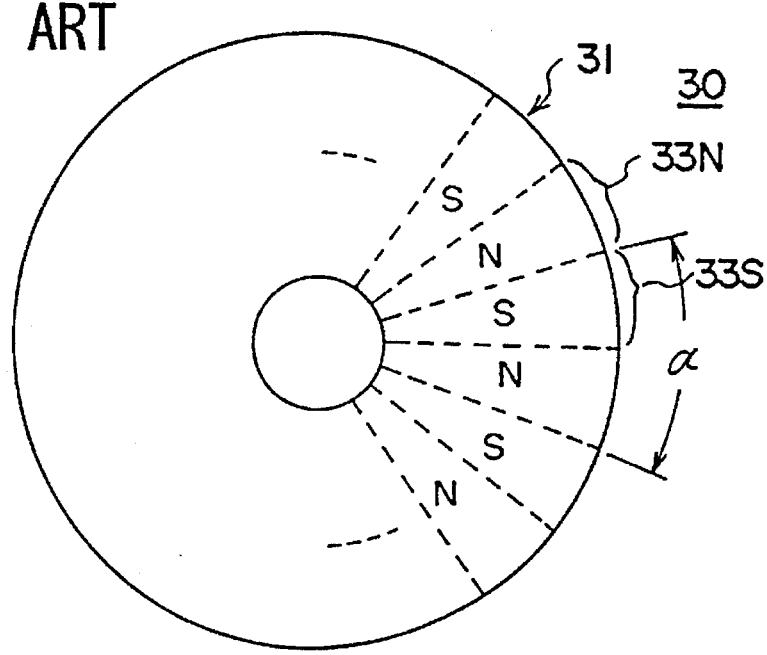
FIG. 3A shows a rotor part of a conventional motor.
Figure 3B:
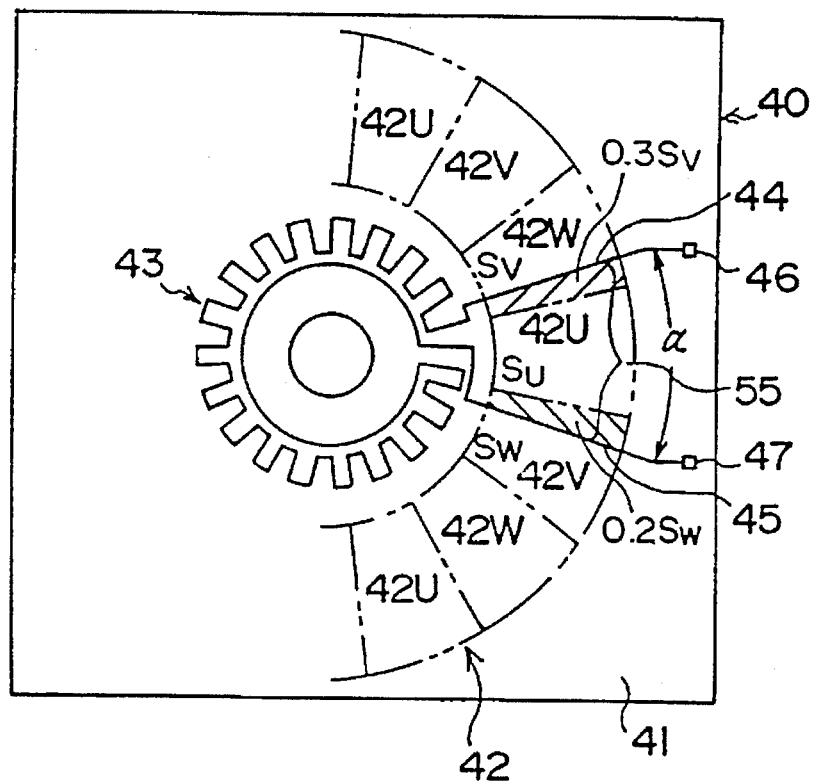
FIG. 3B shows a stator part of the conventional motor.

The motor 60 having the above construction is driven by the motor driving circuit 17 shown in FIG. 1 and controlled by the servo system circuit 18.

More specifically, the Hall elements 64 detects the rotational position of the turntable 70 (rotor magnet 31). In response to the detection by the Hall elements 64, the driving coil composite 42B is energized such that the U-phase coil 42U, the V-phase coil 42V, the W-phase coil 42W, the U-phase coil 42U are energized in the stated order, energization of a given phase coil beginning while the preceding coil is still being energized. In this way, a rotating magnetic field is produced in the stator part 61. The rotating magnetic field causes a torque to be generated in the rotor magnet 31 so that the turntable 70 is rotated clockwise.

The magnetic field produced by the rotating rotor magnet 31 acts on the frequency generating pattern 43 so that a rotational speed detecting signal indicating the current rotational speed of the rotor part 62 is taken from the pattern 43. The rotational speed detecting signal is fed to the servo system circuit 18 shown in FIG. 1.

The motor 60 is controlled so that the angular speed of the magnetic disk 74 mounted on the turntable 70 with respect to a recording head (not shown) is constant irrespective of the position of the recording head. Once the motor 60 rotates at a constant speed, information is read from and written to the magnetic disk 74.

A description will now be given of the lead lines 44B and 45B constituting an important part of the present invention.

As shown in FIGS. 6B and 9, the lead lines 44B and 45B are substantially shaped like spirals traversing the U-phase coil 42U, the V-phase coil 42V and the W-phase coil 42W in a circumferential direction.

More specifically, the lead lines 44B and 45B have the paths described as follows.

(1) Points at intersections of an arc having a given radius and the lead lines 44B and 45B form a regular angle of $\alpha$ with respect to the center O, $\alpha$ being a separation angle formed by a pair of N-pole and S-pole of the rotor magnet 31.

Figure 10:
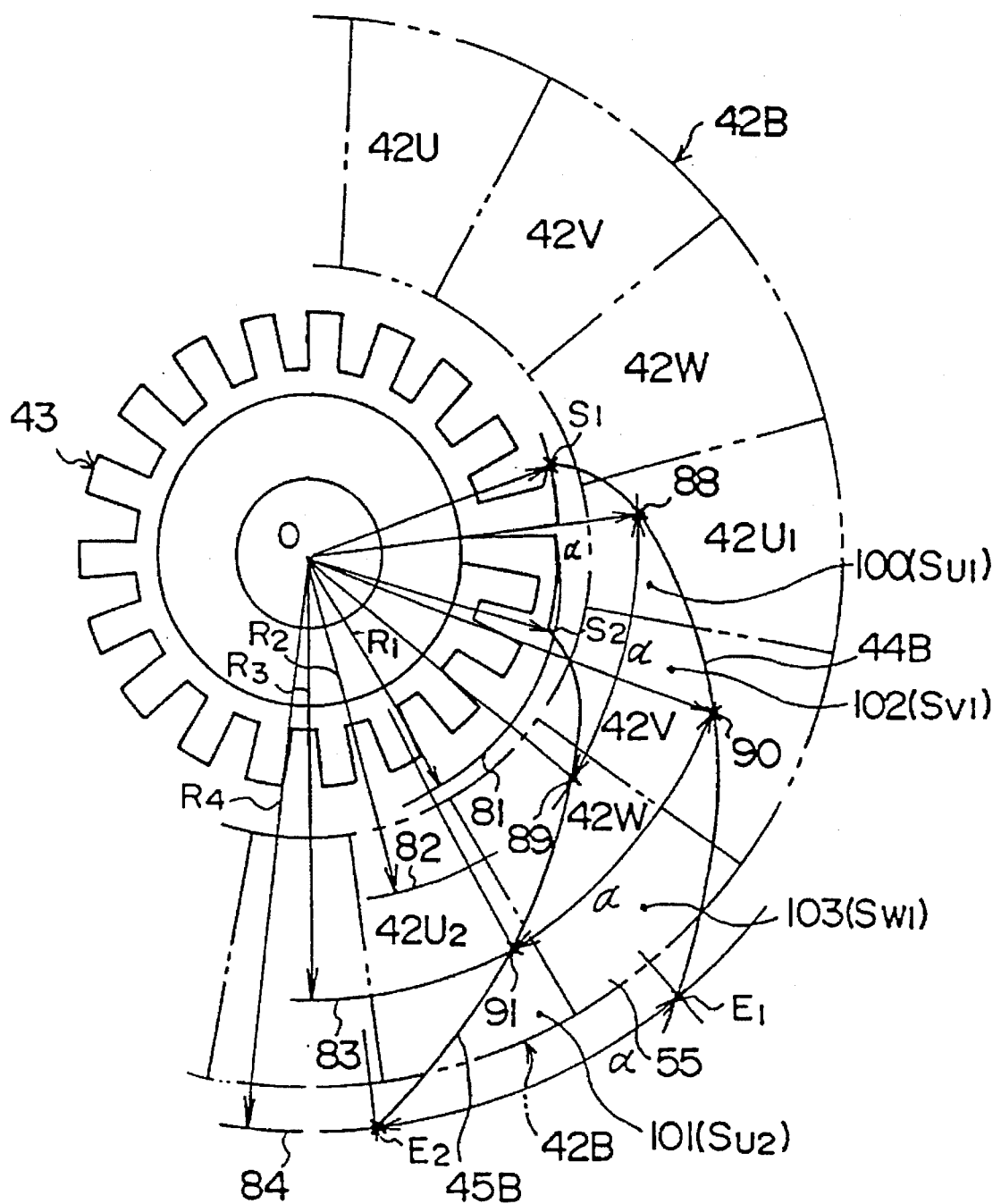
FIG. 10 is a diagram explaining paths of the lead lines shown in FIG. 6B, FIG. 7 and FIG. 9.

FIG. 10 is a diagram explaining paths of the lead lines shown in FIG. 6B, FIG. 7 and FIG. 9. Referring to FIG. 10, an arc 81 has a radius $R_1$, an arc 82 has a radius $R_2$, an arc 83 has a radius $R_3$ and an arc 84 has a radius $R_4$. The radiuses $R_1$, $R_2$, $R_3$ and $R_4$ drawn from the center O (rotational center of the rotor part 62) are different from each other as per $R_1 < R_2 < R_3 < R_4$.

The lead line 44B starts at the point $S_1$ and ends at the point $E_1$. The lead line 45B starts at the point $S_2$ and ends at the point $E_2$.

The points $S_1$ and $S_2$ reside on the arc 81 and are separated from each other by the angle $\alpha$.

Points 88 and 89 reside on the arc 82 and are separated from each other by the angle $\alpha$.

Points 90 and 91 reside on the arc 83 and are separated from each other by the angle $\alpha$.

The points $E_1$ and $E_2$ reside on the arc 84 and are separated from each other by the angle $\alpha$.

The lead line 44B extend so as to pass through the aforementioned points $S_1$, 88, 90 and $E_1$.

The lead line 45B extend so as to pass through the aforementioned points $S_2$, 89, 91 and $E_2$.

Accordingly, points at intersections of an arc having a given radius and the lead lines 44B and 45B form a regular angle of $\alpha$ with respect to the center O.

(2) Assuming that the area 55 and the U-phase coil 42U produce overlapping areas $Su_1$ and $Su_2$ in a top view, that the area 55 and the V-phase coil 42V produce an overlapping area $Sv_1$, and that the area 55 and the W-phase coil 42W produce an overlapping area $Sw_1$, the relationship $Su_1+Su_2$: $Sv_1$:$Sw_1$=1.0:1.0:1.0 exits.

As described above, the motor 60 is constructed such that n=5 and, therefore, a minimum angle D between $S_1$ and $E_1$ and between $S_2$ and $E_2$ is equal to 60/5=12 degrees.

In the above-described embodiment, the angle D is configured to be about 80 degrees, which is about seven times as great as 12 degrees.

The paths of the lead lines 44B and 45B are such that a longitudinal middle portion of the band-like area 55 traverses, in a top view, the W-phase coil 42W and the V-phase coil 42V, that an innermost portion of the area 55 passes under the U-phase coil 42U (42U$_1$ as shown in FIGS. 6B and 10) adjacent to the W-phase coil 42W, and that an outermost portion of the area 55 passes under the U-phase coil 42U (42U$_2$ as shown in FIGS. 6B and 10) adjacent to the V-phase coil 42V.

We assume that the area 55 and the U-phase coil 42U$_1$ produce an overlap 100 having an area $Su_1$, that the area 55 and the U-phase coil 42U$_2$ produce an overlap 101 having an area $Su_2$, that the area 55 and the V-phase coil 42V produce an overlap 102 having an area $Sv_1$, and that the area 55 and the W-phase coil 42W produce an overlap 103 having an area $Sw_1$.

With respect to the paths of the lead lines 44B and 45B, the following relationship obtains:

$$(Su_1+Su_2):Sv_1:Sw_1=1.0:1.0:1.0$$

That is, $$(Su_1+Su_2)=Sv_1=Sw_1$$

A description will now be given of effects obtained by specifying the paths of the lead lines 44B and 45B as described above.

(A) Effects obtained by forming the lead lines 44B and 45B as described in (1) above.

(i) No current is induced in the lead lines 44B and 45B due to the alternating magnetic flux produced by the rotor magnet 31 rotating.

Figure 11:
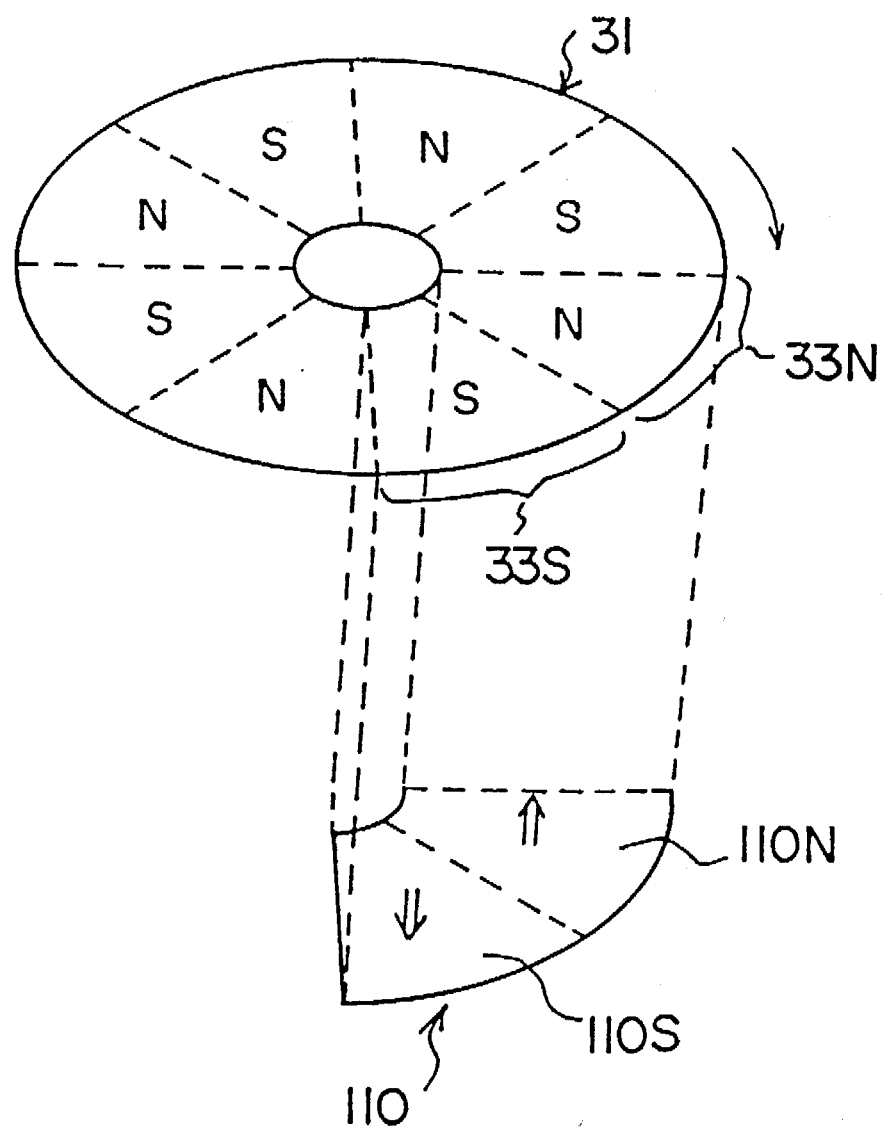
FIG. 11 is a diagram explaining effect of alternating magnetic flux produced by a rotation of a rotor magnet.

FIG. 11 explains the influence of the alternating magnetic flux produced by the rotor magnet 31 rotating.

Referring to FIG. 11, an area 110 on the driving coil composite 42B is opposite to a pair of magnetic poles 33N and 33S of the rotor magnet 31.

The area 110 comprises an area 110N corresponding to the N-pole 33N and an area 110S corresponding to the S-pole 33S.

The magnetic flux B produced by the rotating rotor magnet 31 and acting on the area 110 is given by:

$$B(t)=B_S \cdot \cos\omega t + B_N \cdot \cos\omega t$$

where $B_S$ indicates a magnetic flux from the S-pole 33S, $B_N$ indicates a magnetic flux from the N-pole 33N, and $\omega$ indicates an angular speed of the variation in the magnetic flux which speed obtains when the rotational speed is constant.

Because $B_N=-B_S$, the above equation is rewritten as $$B(t)=B \cdot \cos\omega t - B \cdot \cos\omega t=0$$

Thus, the magnetic flux acting on the area 110 becomes zero irrespective of a time t, that is, the position of the magnet.

Figure 12:
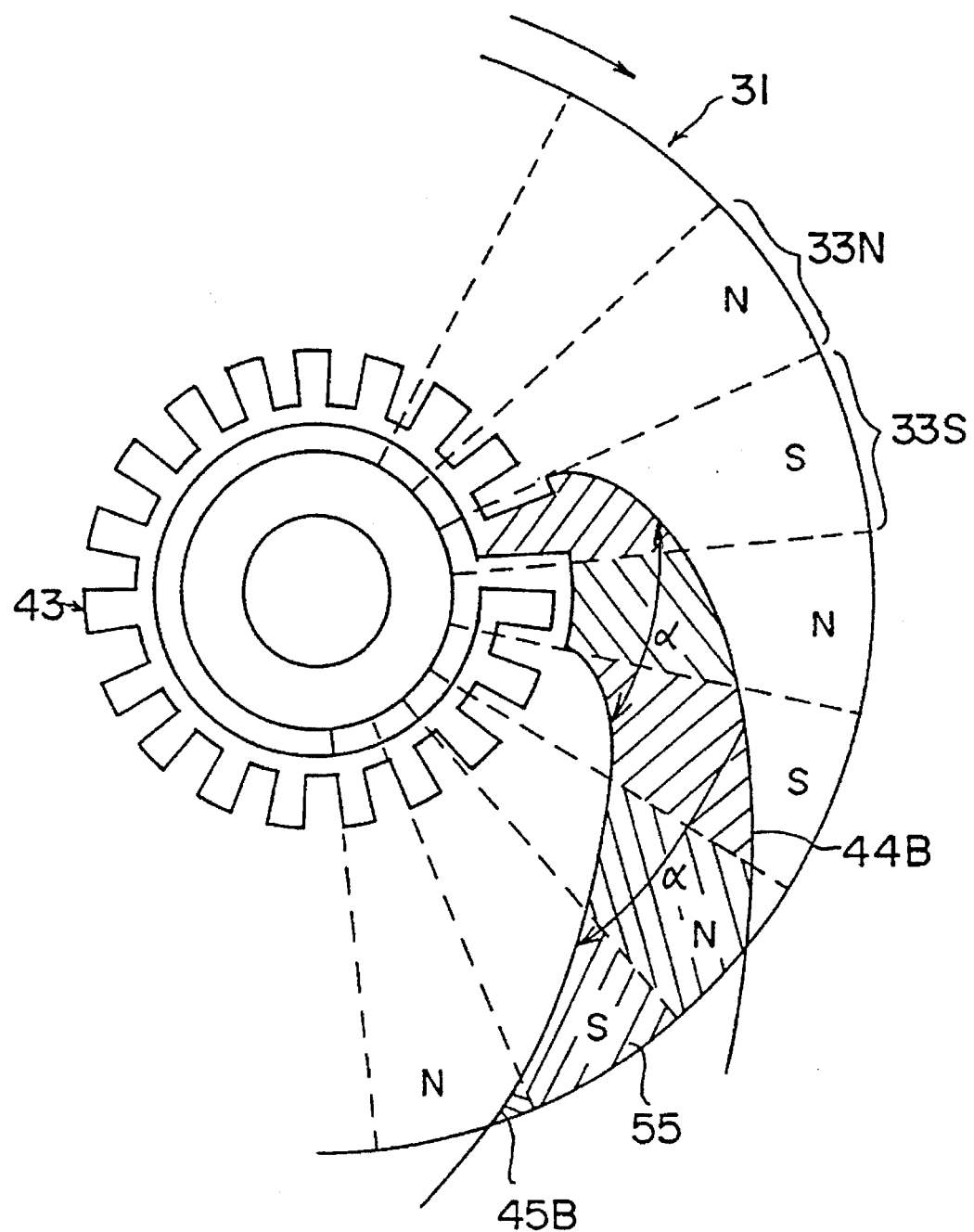
FIG. 12 is a diagram explaining that the alternating magnetic flux produced by the rotation of the rotor magnet does not induce a current in the lead lines.

FIG. 12 shows a relationship between a magnetization pattern of the rotor magnet 31 and the lead lines 44B and 45B.

As we can learn from FIG. 12, the lead lines 44B and 45B traverse, in a top view, a plurality of magnetized parts of the rotor magnet 31.

An angle formed by the lead lines 44B and 45B is always $\alpha$.

Therefore, designating an area (hatched by downward lines from left to right) of the N-poles 33N of the rotor magnet 31, which area faces the area 55 as an N-pole area, and an area (hatched by downward lines from right to left) of the S-pole 33S of the rotor magnet 31, which area faces the area 55 as an S-pole area, the N-pole area and the S-pole area are equal to each other irrespective of the position of the rotor magnet 31 during its rotation.

By maintaining a separation angle between the spirally extending lines 44B and 45B at a constant magnitude, it is ensured that the N-pole area and the S-pole area covered by a one-turn coil constituted by the lines 44B and 45B are always equal to each other. No current is consequently induced so that noise is prevented from being produced in the lines 44B and 45B.

A consideration is now given to a case where precision of the magnetization position of the rotor magnet 31 exhibits a spatial variation, or a case where the rotor magnet 31 has an eccentricity.

When precision with which the rotor magnet is magnetized exhibits a variation from area to area, or when the rotor magnet 31 has an eccentricity, a difference may be created between the above-described N-pole area and the S-pole area, depending on the paths of the lead lines. This causes a difference between a volume of the S magnetic flux and a volume of the S magnetic flux in the one-turn coil constituted by the lead lines 44B and 45B. Consequently, a current is induced in the lines 44B and 45B.

However, since the lead lines 44B and 45B are made to extend spirally so that the separation angle is maintained at a regular value of α, a difference between the N-pole area and the S-pole area can be maintained relatively low level, despite a spatial variation in precision with which the rotor magnet 31 is magnetized or an eccentricity of the rotor magnet 31. As a result, a difference between the volume of the S magnetic flux and the volume of the N magnetic flux can be maintained relatively low. An induced current is prevented from being produced in the lead lines 44B and 45B as much as possible so that noise is prevented from being produced as much as possible.

Accordingly, it is possible to prevent noise from being produced effectively irrespective of how the rotor magnet 31 is magnetized or how precisely the rotor magnet 31 is centered. Therefore, the motor 60 as described above is adapted for mass production.

(B) Effects obtained by forming the lead lines 44B and 45B as described in (2) above.

(i) Influence of the rotating magnetic field produced by the driving coil composite 42B can be eliminated.

The relationship $$(Su_1+Su_2):Sv_1:Sw_1=1.0:1.0:1.0$$

ensures that a relative value of the density of the magnetic flux produced by the driving coil composite 42B and passing through the area 55 between the lead lines 44B and 45B is 0.000. This is indicated as the case ⑤ in FIG. 4.

Thus, no current is induced in the lead lines 44B and 45B due to the rotating magnetic field produced by the driving coil composite 42B.

In this way, it is possible to decrease the level of noise significantly and obtain a rotational speed detecting signal characterized by no degradation in the S/N ratio. Accordingly, the speed of the motor 60 can be controlled stably. A decisive benefit of this is that it is possible to read information from and write information to a magnetic disk in a satisfactory manner in terms of the quality.

A description will now be given of a variation of the embodiment of the present invention.

It will be noted that if we can reduce the relative value of the density of the magnetic flux produced by the driving coil composite and acting on the area 55 between the pair of lead lines, from a conventional level of 0.75 to a improved level of about 0.400, it is possible to obtain a rotational speed detecting signal characterized by little degradation in the S/N ratio.

Therefore, the present invention is not limited to the embodiment described above, the lead lines 44B and 45B may be arranged in a slightly different way.

For example, the lead lines may be arranged so as to satisfy the following equation:

$$(Su_1+Su_2):Sv_1:Sw_1=1.0:0.6:0.6$$

If we arrange the lead lines in this way, it is possible to obtain a rotational speed detecting signal in which the degradation in the S/N ratio is suppressed to about 50% of the conventional level.

Alternatively, the lead lines may be arranged so as to satisfy the following equation:

$$(Su_1+Su_2):Sv_1:Sw_1=1.0:0.8:0.9$$

If we arrange the lead lines in this way, the relative value of the magnetic flux becomes 0.173 as indicated by ⑥ in FIG. 4, it is possible to obtain a rotational speed detecting signal in which the degradation in the S/N ratio is suppressed to about 14% of the conventional level.

To summarize, the arrangement of the paths of the lines may be such that:

$$(Su_1+Su_2):Sv_1:Sw_1=1.0:0.6-1.0:0.6-1.0$$

In other words, the relative value of the magnetic flux may be within a range defined by a broken line 120 in FIG. 4.

The angle formed by the lead lines may have a value obtained by multiplying α by an integer. For example, the angle may be 2×α or 3×α.

Figure 13:
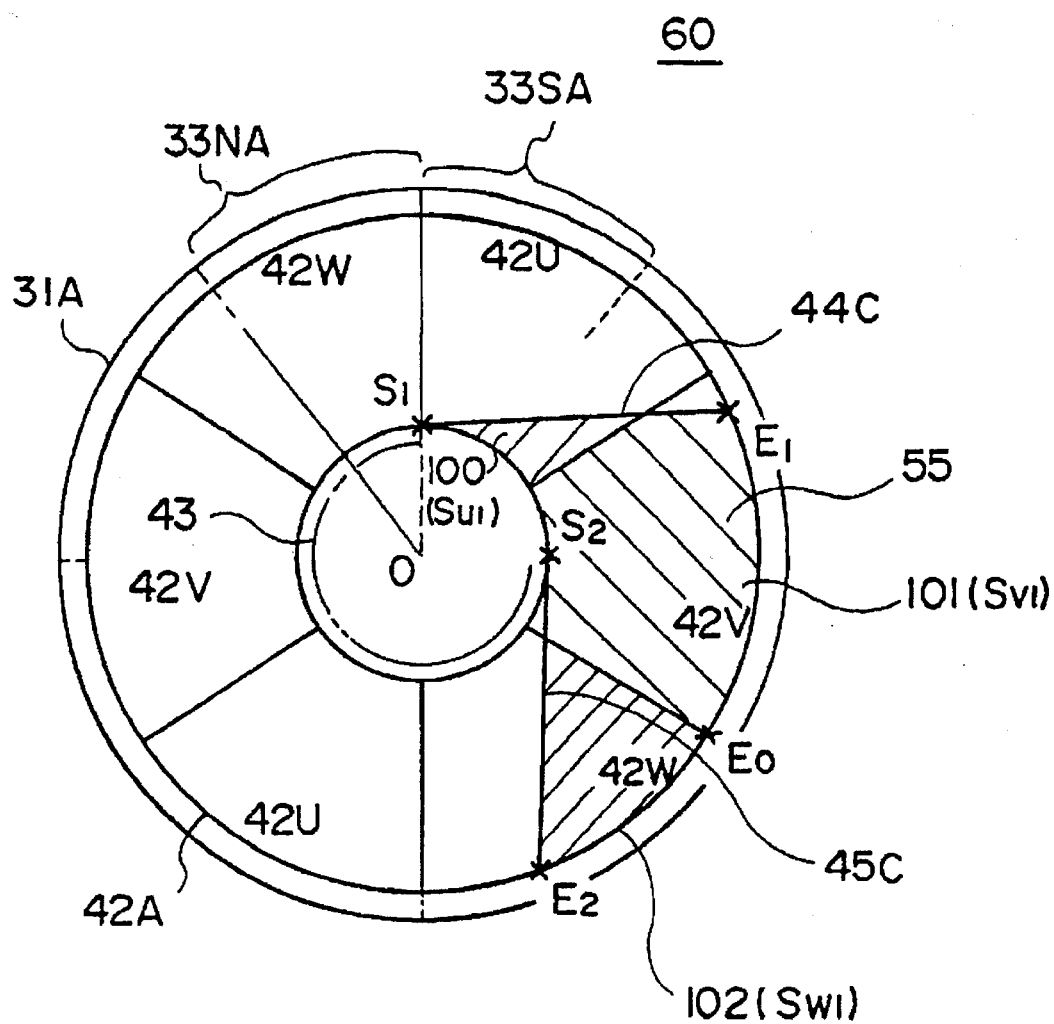
FIG. 13 is a diagram showing a simplified variation of the embodiment of the present invention.

FIG. 13 shows a simplified variation of the embodiment described above. Referring to FIG. 13, two lead lines 44C and 45C have straight paths that traverse phase coils of the driving coil composite 42A in respective circumferential directions. This simplified construction also ensures that the relative value of the density of the magnetic flux produced by the driving coil composite 42A and acting on the area 55 between the pair of lead lines is reduced to a satisfactory level so that it is possible to obtain a rotational speed detecting signal characterized by little degradation in the S/N ratio.

The present invention finds an application not only in three-phase driving system as described above, but also in other driving systems, such as a two-phase driving system or a four-phase driving system.

The present invention is not limited to the above described embodiments, and variations and modifications may be made without departing from the scope of the present invention.

What is claimed is:

1. A motor comprising:

a stator comprising a substrate and a ring-like stator winding provided on said substrate for producing a rotating magnetic field for driving the motor, said stator winding comprising a plurality of circumferentially adjacent phase coils, said ring-like stator winding defining a center on said substrate for said stator;

a generally annular frequency generating pattern provided on said substrate within said ring-like stator winding;

a rotor facing said stator winding across an axial air gap, said rotor comprising a plurality of circumferentially adjacent magnetic segments grouped into adjacent pairs of S-pole and N-pole magnetic segments; and two lead lines, each of said lead lines having a first end connected to said frequency generator pattern and a second end located at the periphery of said ring-like stator winding, said first ends of said lead lines being connected to said frequency generator pattern at circumferentially spaced locations on said frequency generator pattern, said second ends being at locations that are circumferentially spaced with respect to the periphery of said ring-like stator winding, said lead lines extending along paths between said first and second ends that traverse said phase coils of said stator winding and lie generally parallel to said substrate, the location of said second end of each of said lead lines being circumferentially displaced with respect to the connection of said first end of that lead line to said frequency generator pattern and being displaced out of radial alignment with said first end, and wherein said paths of said lead lines are formed such that a constant, circumferentially measured, separation angle exists between said two lead lines, said constant, circumferentially measured separation angle being measured circumferentially between any pair of points comprised of a point on one of said lead lines and a point on the other of said lead lines, said points being located at the same radial distance from said center, said separation angle being that obtained by multiplying an integer and the angle occupied by an adjacent pair of S-pole and N-pole magnet segments of said rotor, and being such that substantially equal areas of each of the traversed phase coils are found in the area between the two lead lines.

2. The motor as claimed in claim 1, wherein said paths of said two lead lines extend generally spirally from the frequency generator pattern to the periphery of said stator winding.

3. The motor as claimed in claim 1, wherein said paths of said two lead lines extend generally straight from said frequency generator pattern to the periphery of said stator winding.

* * * * *